United States Patent [19]
Hiemsoth

[11] Patent Number: 5,209,266
[45] Date of Patent: May 11, 1993

[54] HIGH PRESSURE INFLATABLE PLUG DEVICE

[75] Inventor: Steven J. Hiemsoth, Brooklyn Park, Minn.

[73] Assignee: Cherne Industries Incorporated, Minneapolis, Minn.

[21] Appl. No.: 915,123

[22] Filed: Jul. 14, 1992

Related U.S. Application Data

[63] Continuation of Ser. No. 625,380, Dec. 11, 1990, abandoned.

[51] Int. Cl.[5] .............................. F16L 55/10
[52] U.S. Cl. .................................. 138/90; 138/93; 138/89
[58] Field of Search ................. 138/89, 90, 93; 220/239; 165/71; 73/49.1, 49.5, 49.8

[56] References Cited

U.S. PATENT DOCUMENTS

| | | | |
|---|---|---|---|
| 1,710,439 | 4/1929 | Taylor | 138/90 |
| 2,130,030 | 9/1938 | Richardson | 138/93 |
| 2,927,609 | 3/1960 | Vander Lans | 138/93 |
| 3,593,749 | 7/1971 | Reardon | 138/93 |
| 3,870,085 | 3/1975 | Schneider | 138/93 |
| 4,250,926 | 2/1981 | Satterthwaite | 138/93 |
| 4,342,336 | 8/1982 | Satterthwaite | 138/90 |
| 4,365,649 | 12/1982 | Jones | 138/93 |
| 4,506,706 | 3/1985 | Sandman | 138/93 |
| 4,526,207 | 7/1985 | Burkley et al. | 138/93 |
| 4,671,518 | 6/1987 | Retz | 138/93 |
| 4,827,984 | 5/1989 | Young et al. | 138/93 |
| 5,035,265 | 7/1991 | Chen | 138/89 |
| 5,044,403 | 9/1991 | Chen | 138/89 |

FOREIGN PATENT DOCUMENTS

| | | | |
|---|---|---|---|
| 1216632 | 5/1966 | Fed. Rep. of Germany | 138/89 |
| 0001399 | of 1904 | United Kingdom | 138/93 |
| 0329401 | 5/1930 | United Kingdom | 138/93 |

Primary Examiner—Philip R. Coe
Assistant Examiner—James F. Hook
Attorney, Agent, or Firm—Joel D. Skinner

[57] ABSTRACT

An inflatable, expansible, multisize plug device which seals and locks the interior of a pipeline section. The plug device comprises a cylindrical body structure and includes a central member and removable inner and outer disc members attached thereto. The outer disc member further has a raised screw mounting structure longitudinally formed thereon. An inflatable elastomeric sealing ring is disposed annularly about the body structure, and forms an inner cavity between the sealing ring and the body structure. The sealing ring further has a generally rectangular, open bottomed cross-section with an outer contact wall of a predetermined longitudinal width and a pair of depending radial walls. Each radial wall terminates in an end portion and the end portions sealingly connect the body structure via spacially parallel, annular channel structures which are axially disposed in the body structure and which have generally T-shaped cross-sectional configurations with respect to the overall body structure. The plug device further has an inflator which permits the ingress and egress of fluid into and out of the inner cavity. A plurality of radially aligned locking screws are arranged to mechanically engage the pipeline interior wall, and are disposed in the screw mounting structure.

14 Claims, 7 Drawing Sheets

HIGH PRESSURE INFLATABLE PLUG DEVICE

This is a continuation of application Ser. No. 07/625,380 filed on Dec. 11, 1990, and now abandoned.

BACKGROUND OF THE INVENTION

This invention relates to a plug device used to seal the interior of a pipeline, and more particularly to an inflatable, expansible, multisize plug device for sealing the interior of a pipeline or other conduit and for locking engagement therewith. The device is particularly useful for the portable, releasable and reusable sealing of high pressure pipelines of various sizes.

In the past, various devices have been used and proposed to seal pipeline sections having varying pressures and contents. However, these devices are generally complex, difficult to use, and are inefficient and expensive to manufacture. Specifically, some such plugs have inflatable seals of a looped or continuous nature and, therefore, require adhesive bonding or elaborate sealing structures. Still others are unusable in certain corrosive or high pressure pipeline environments. Finally, some such prior art plug structures are suitable for use only in a specific size or type of pipeline or conduit.

Despite the need for a high pressure, multisize plug device in the art which is efficient to manufacture and use, and which overcomes the limitations and problems of the prior art, none insofar as is known has been proposed or developed.

Accordingly, it is an object of the present invention to provide a plug device of an efficient and reliable design which is usable over a range of sealing diameters to seal conduit of varying diameters and types, and which is usable in a variety of pipeline environments including corrosive and high pressure environments.

SUMMARY OF THE INVENTION

The present invention provides an inflatable, expansible, multisize plug device which seals and locks the interior of a pipeline section. The plug device comprises a cylindrical body structure and includes a central member and removable inner and outer disc members attached thereto. The outer disc member further has a raised screw mounting structure longitudinally formed thereon. An inflatable elastomeric sealing ring is disposed annularly about the body structure, and forms an inner cavity between the sealing ring and the body structure. The sealing ring further has a generally rectangular, open bottomed cross-section with an outer contact wall of a predetermined longitudinal width and a pair of depending radial walls. Each radial wall terminates in an end portion, and the end portions are sealingly connected to the body structure via spacially parallel, annular channel structures which are disposed on the circumference of the body structure, and which have generally T-shaped cross-sectional configurations. The plug device further has ports and passages which permit the ingress and egress of fluid into and out of the inner cavity. A plurality of radially aligned and outwardly extendable locking screws are arranged to mechanically engage the pipeline interior wall, and are disposed in the screw mounting structure. These and other benefits of this invention will become clear from the following description by reference to the drawings.

DESCRIPTION OF THE PREFERRED EMBODIMENT

Figure 1:
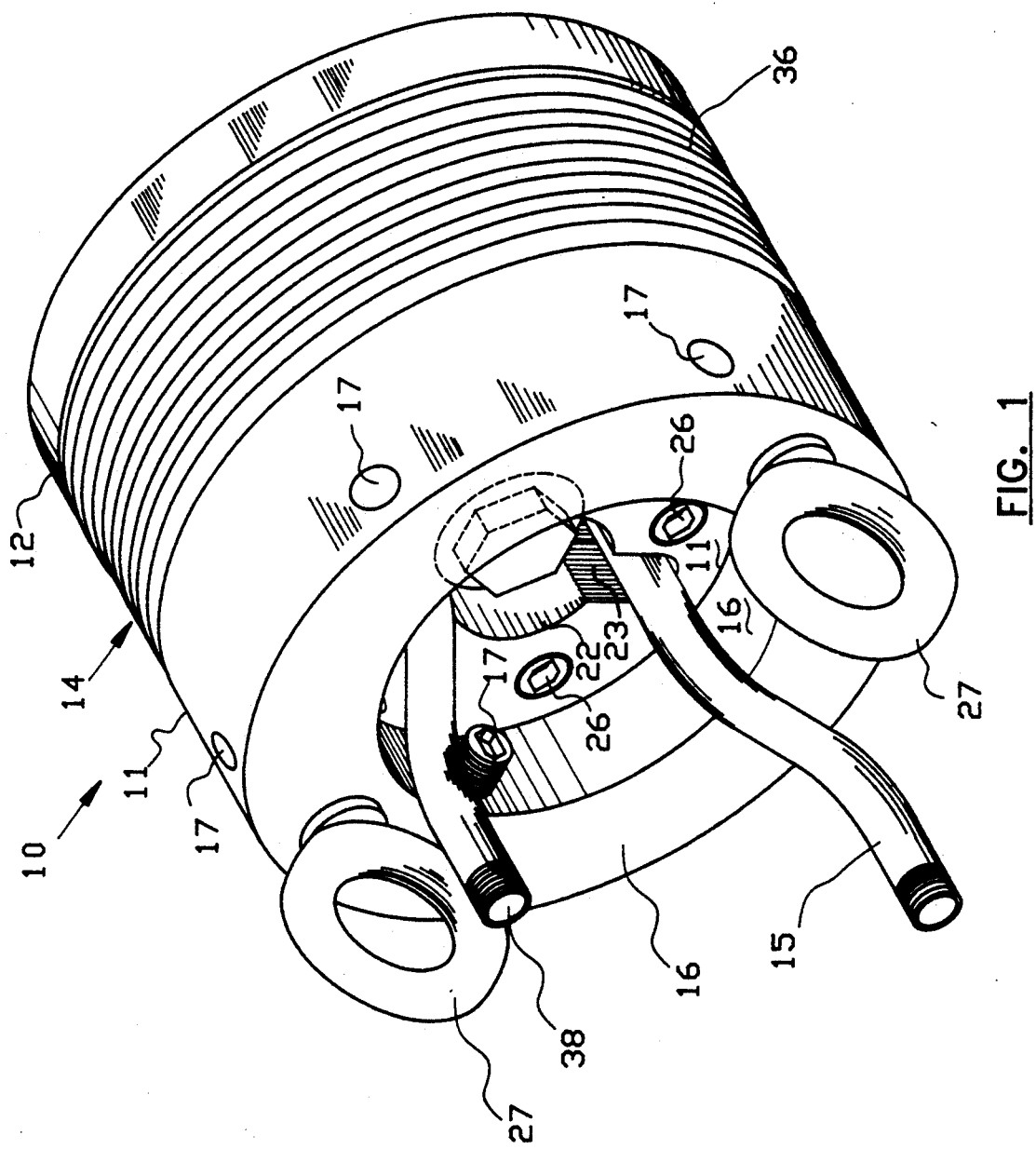
FIG. 1 is a perspective view of the inflatable plug device of the present invention.
Figure 2:
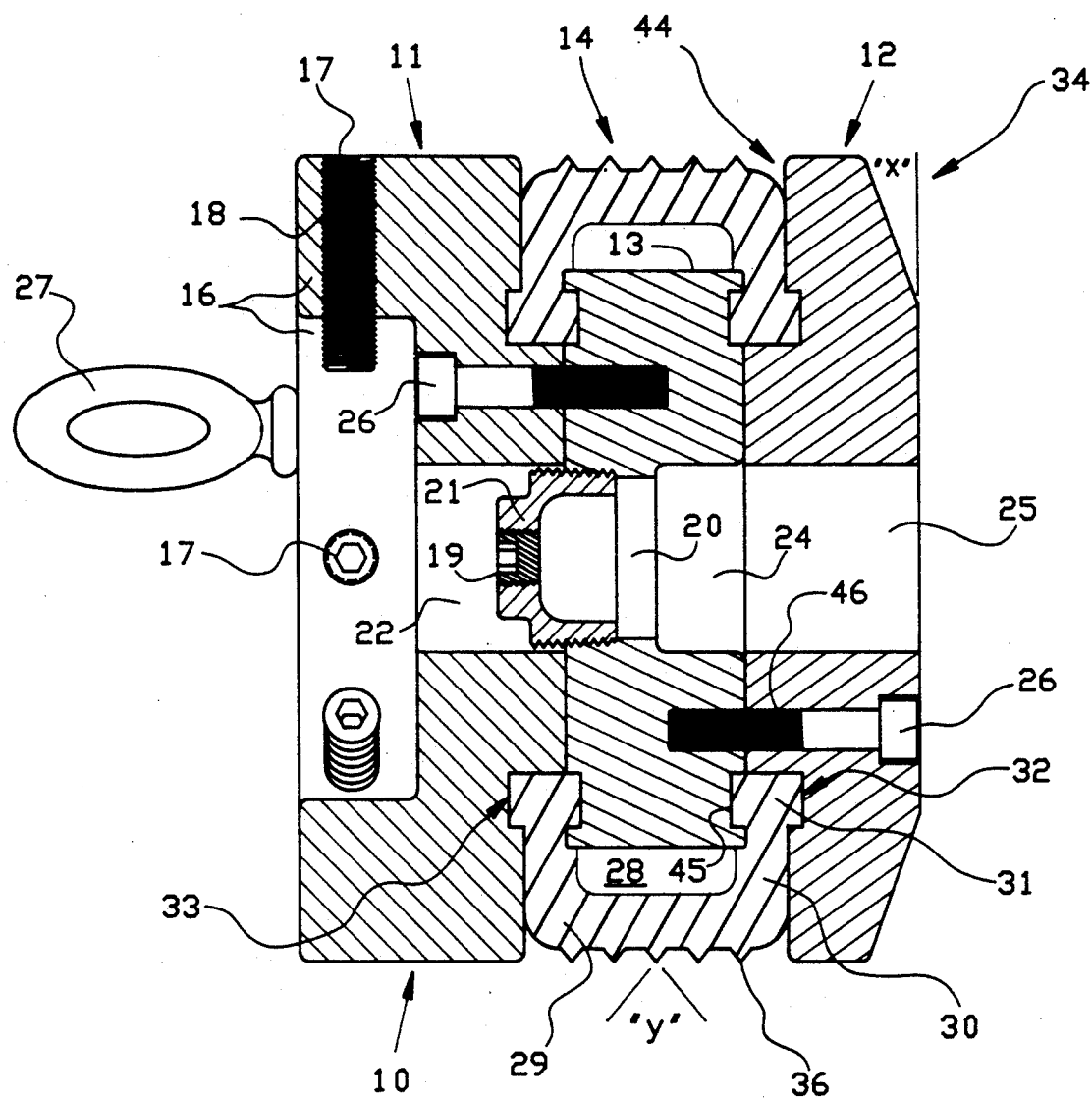
FIG. 2 is a cross-sectional view of the plug taken along line 2—2 of FIG. 3.
Figure 3:
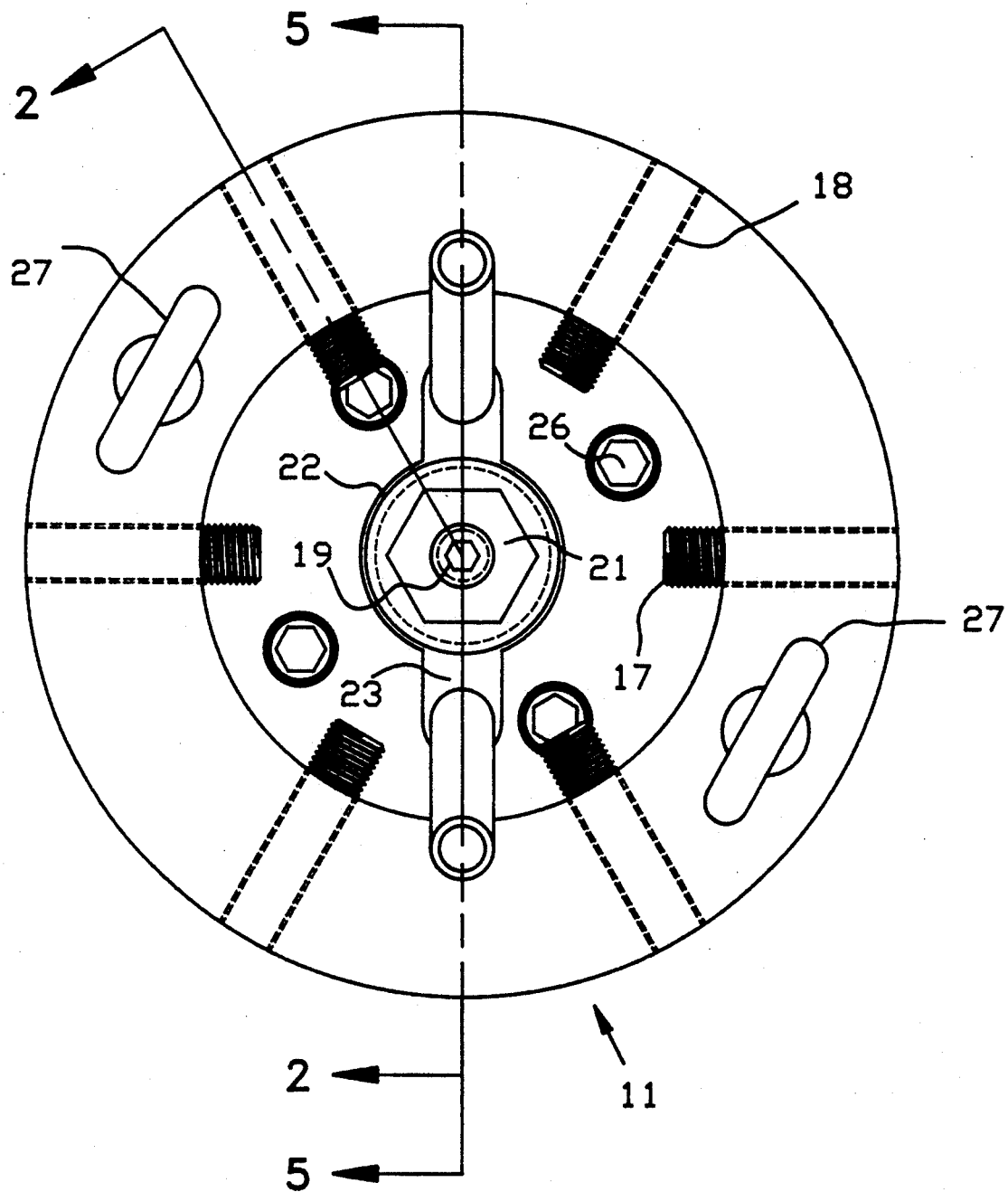
FIG. 3 is a top plan view of the plug, showing the outer end plate thereof.
Figure 4:
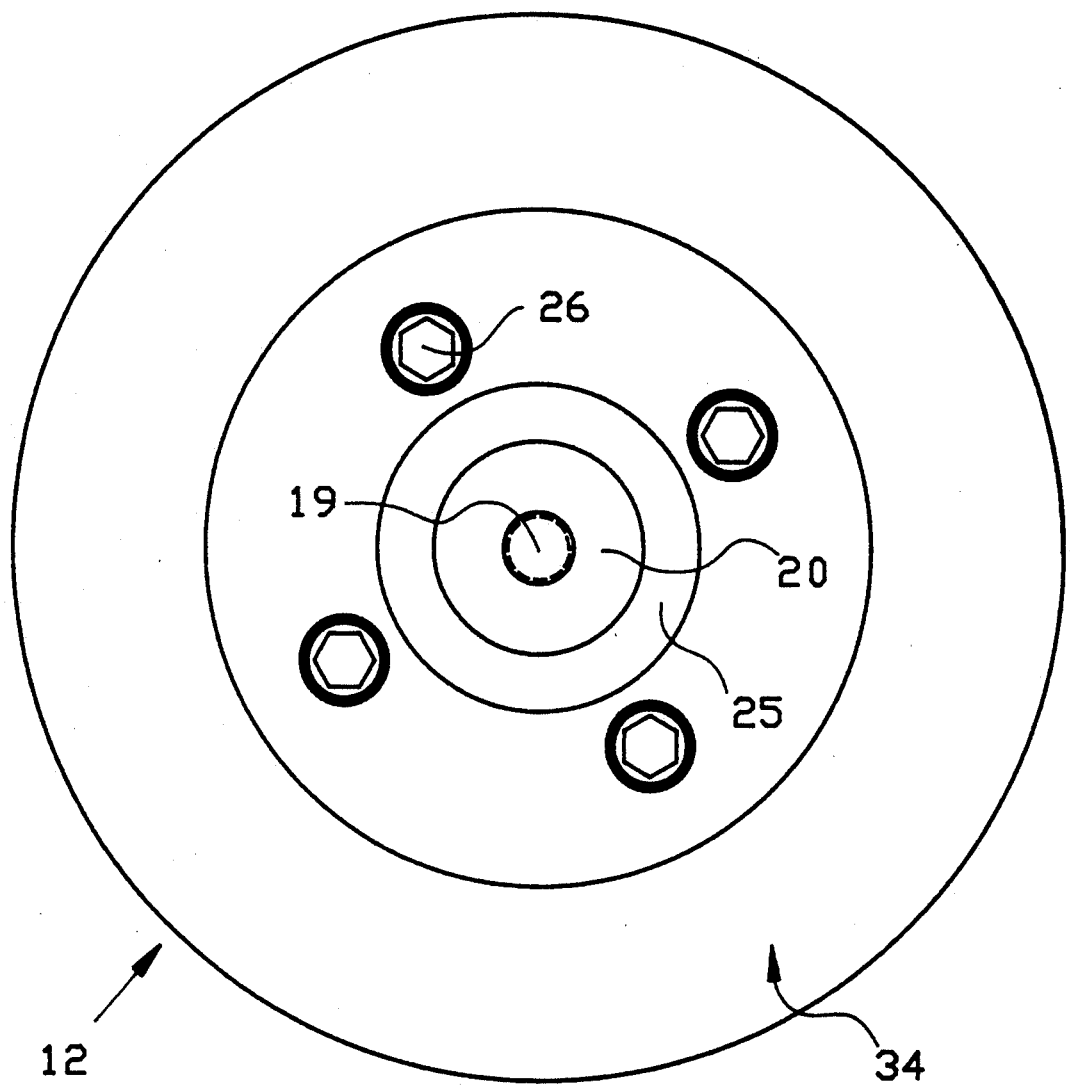
FIG. 4 is a top plan view of the plug, showing the inner end plate thereof.

Referring to FIGS. 1 and 2, the disc plug 10 has a generally cylindrical body structure, and a circular cross-sectional configuration. The body structure consists of a center section 13 with a pair of plate members 11 and 12 disposed at each end thereof. An annular sealing member or ring 14 is shown to be disposed about the circumference of the body structure at approximately its midpoint. The sealing ring 14 is preferably a unitary, molded structure. The plug 10 is inflatable to variable diameters or widths to seal pipelines or other conduits of various sizes within a certain size range, for example, a series of plug sizes will accommodate various types or classes of pipe with diameters from approximately 3 to 24 inches. Such a series may include a plurality of plugs having size increments of, for example, two inches. The overall structure of the disc plug 10 permits outward expansion of the sealing member, a distance which is greater than that previously provided by prior art plug devices. Therefore, the plug device 10 of this invention may be used in a broader range of pipeline sizes, and in plug types such as plastic, concrete, steel and cast iron.

The center section or member 13 of the body structure has a circular configuration and is preferably constructed of a rigid metallic material such as aluminum. The outer disc or plate 11 member is connected to one end of the center section 13, and the inner disc or plate member 12 is connected to the center section 13 at its opposite end. Both the inner and outer plates 11 and 12 are shown to be connected to the center section 13 via connection bolts 26. In use, the inner plate 12 faces the interior or sealed side of the conduit, while the outer plate 11 faces the outer or open end of the conduit. The inner plate 12 and outer plate 11 have relatively thin, circular configurations and are both preferably constructed of a rigid material, such as aluminum. Alternatively, the utilization of a stronger metal, such as steel, would increase strength and permit the disc plug 10 to withstand higher backpressures. The plates 11 and 12 could also be cast out of brass and stainless steel depending upon environmental considerations. The center section 13 may alternatively be constructed of a different material than that of the plates 11 and 12, thereby resulting in a non-homogeneous body structure. The inner plate 12 preferably has a tapered circumferential area 34, which is shown to form an angle "X", of approximately five to twenty degrees relative to the plane of the plate 12.

The central section 13 is shown to have a first predetermined diameter, and the inner and outer plate sections 12 and 11 have a second predetermined diameter which, importantly, is greater than that of the first predetermined diameter. The actual diameters of the respective elements 11, 12 and 13 is dependent upon the size range of the conduit for which the plug 10 is designed. This differential structure forms a circumferential recess area 44 at which the sealing member 14 is disposed. The plate sections 11 and 12 form flat side walls of the recess area 44 which abut the sealing member radial walls 30 to prevent longitudinal expansion of the radial walls 30.

The outer plate 11 is shown to have an axial aperture 22 which is aligned with axial apertures 20 and 24 in the center section 13, and an axial aperture 25 in inner plate 12. These aligned apertures 22, 20, 24 and 25 form a bypass aperture through the body structure which permits the passage of fluids or other materials in the conduit while the plug 10 is operatively connected therein, for example, for the introduction of test media into the conduit. A bypass aperture plug 21 having exteriorly disposed threads is shown to be connected in a threaded portion of the aperture 20 for sealing the bypass aperture. Additionally, a smaller secondary bypass aperture 19, including a plug or cap, is shown incorporated in the threaded structure of the bypass plug 21.

Figure 5:
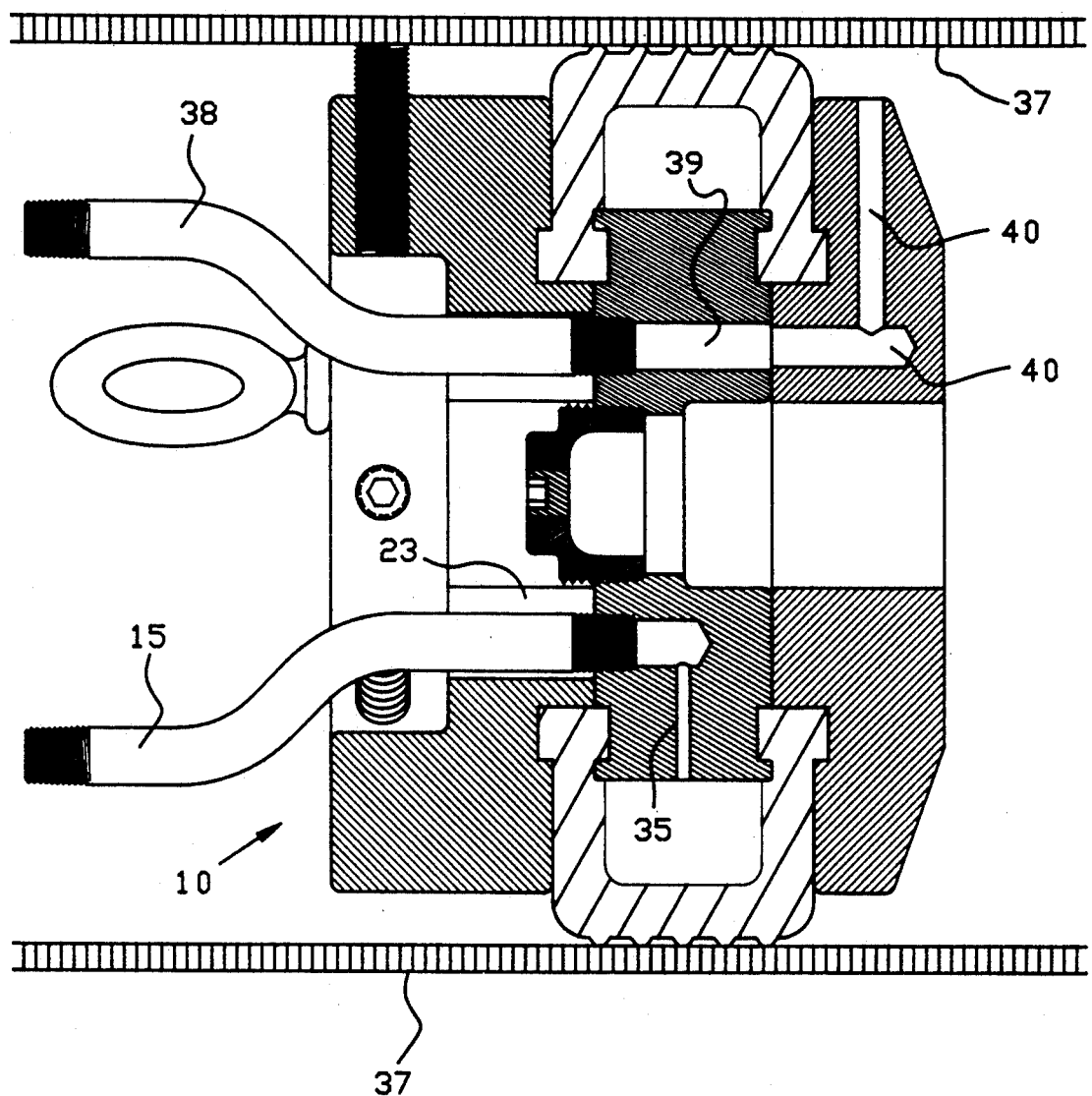
FIG. 5 is a cross-sectional view of the plug taken along line 5—5 of FIG. 3, and further being operatively disposed within a conduit.

FIGS. 1 and 5 show a secondary bypass conduit 38 which is also usable to permit the passage of fluids and/or other materials through the plug structure 10 while it is disposed within pipeline or conduit 37. The purpose of the secondary bypass 38 is to allow the escape of air or gas from a closed system while filling with liquid through the above-mentioned central aperture. The secondary bypass conduit 38 is an elongated and curved tubular structure which is threaded at each of its ends. One end is connected to a threaded aperture 39 in center section 13. The aperture 39 is aligned with a channel 40 in the inner plate member 12 which extends to the circumference of the plate member 12, where it is exposed to the interior environment of the pipeline 37.

The outer plate preferably has a circumferentially disposed boss or extension 16 which extends longitudinally from its outside surface and forms a central depression on the top surface of the plate 11. A plurality of threaded apertures 18 are disposed radially through the boss 16. Threaded screws or bolts 17 are shown disposed within the apertures 18 and are adjustable so that they extend outwardly to lockingly engage the interior surface of the pipeline 37, as shown in FIG. 5. The utilization of the locking screws 17 provides a physical locking structure which permits the plug 10 to withstand backpressures of approximately 250 psig. The threaded apertures 18 and screws 17 are arranged in a predetermined pattern such that the locking forces exerted thereby are evenly distributed against the pipeline interior, and so as to center the plug 10 within the pipeline 37. The central depression formed by the boss 16 further permits the user to engage the screws 17 with a tool, such as a hex key or the like.

Figure 6:
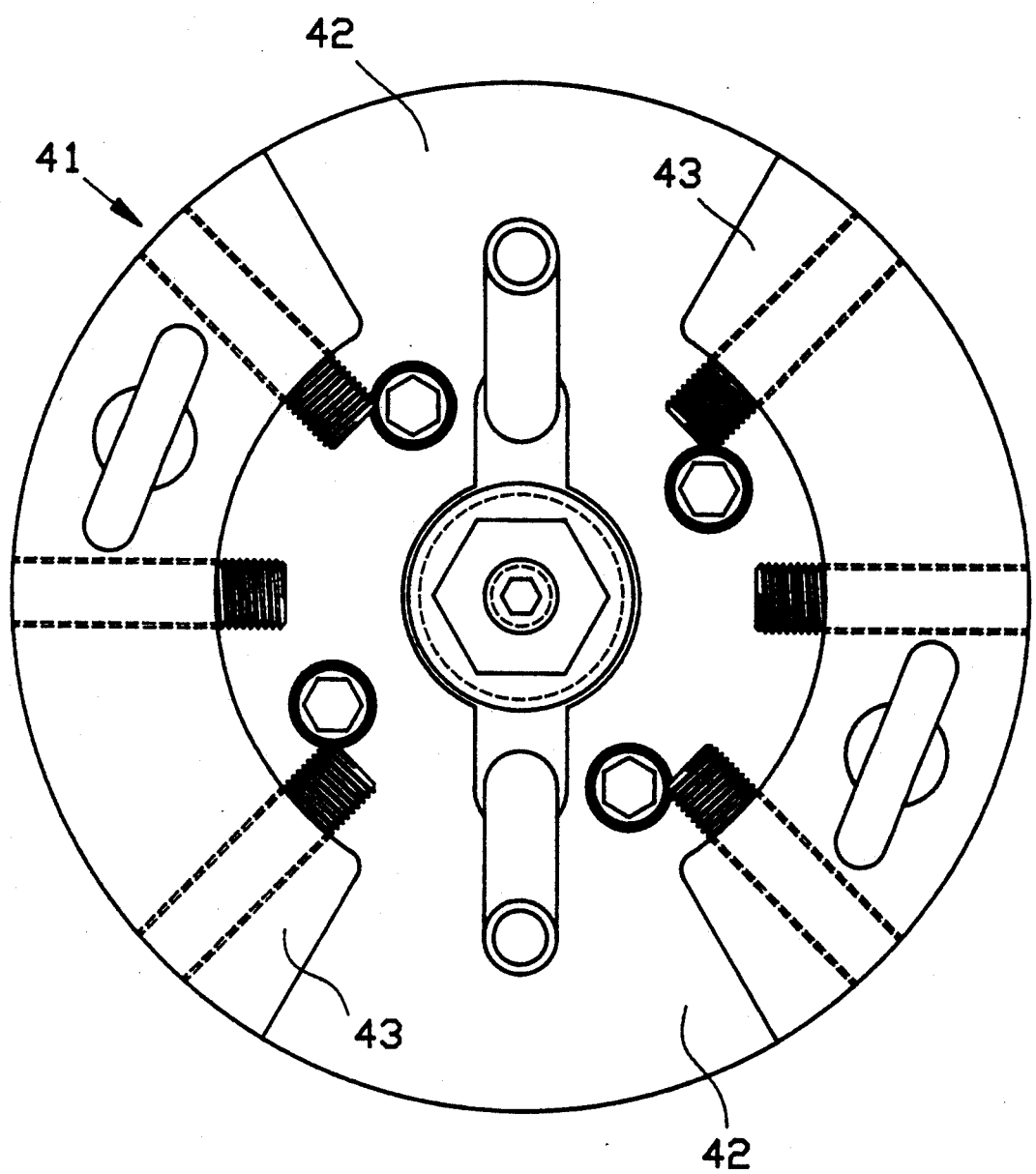
FIG. 6 is a top plan view of an alternate embodiment of the plug outer plate member.

FIG. 6 shows an alternative embodiment of the plug 41 wherein the outer plate member 42 has a pair of opposing axially aligned screw mounting members or bosses 43 which extend from the exterior surface of the outer plate member 42. Each boss 43 is generally circumferentially formed along an arc through approximately 90 degrees relative to the central axis of the plate member 42. Each boss 43 is shown to have three threaded apertures equidistantly spaced therein, and aligned with the apertures in the opposing boss 43.

Figure 7:
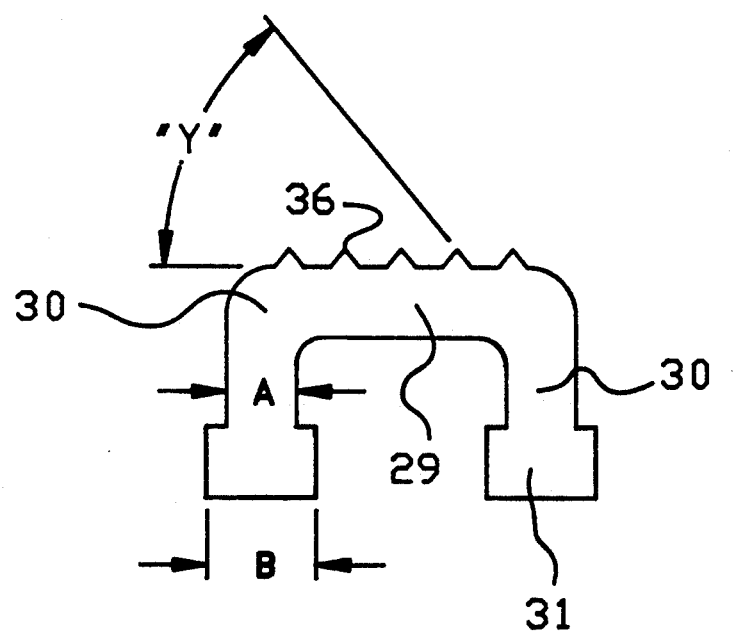
FIG. 7 is a cross-sectional view of the inflatable elastomeric sealing member, shown detached from the plug body structure.

The sealing ring 14 is disposed circumferentially about the body structure and forms an inner cavity 28 between itself and the body structure. Referring also to FIG. 7, the sealing member 14 is shown to have a generally rectangular, open bottom cross-section with an outer contact wall 29 of a predetermined longitudinal length, and a pair of depending radial walls 30 of a second predetermined length. The radial walls 30 terminate in end portions 31 which form generally spacially parallel rings. The end portion rings 31 are sealingly connected to the body structure as discussed further in detail below. Importantly, the sealing member 14 end portions 31 each have a generally T-shaped cross-sectional configuration, including narrow and wide portions "A" and "B", respectively. In its uninflated state, the sealing member 14 is shown to be completely disposed within the recess area 44, and its contact wall 29 is substantially flush with the perimeter of the plates 11 and 12 to permit insertion of the plug 10 in a conduit. The sealing member 14 is radially expansible outwardly a predetermined distance of approximately 10–125% of the length of its radial walls 30. A total operative expansion distance of approximately ⅜ inch is preferred for plug sizes of approximately 6–16 inches in diameter. Variable expansion allows the plug 10 to be utilized for sealing pipelines or conduits of varying diameters within a certain size range, depending upon the actual size of the plug.

The sealing member 14 is constructed of an elastomeric material which preferably has a durometer range of 40–85 Shore A. The elastomeric material from which the sealing member 14 is constructed is preferably selected from the group of materials consisting of natural rubber, nitrile, viton, urethane, neoprene and isoprene. The specific elastomer may be varied to allow the disc plug to function in a wide range of environments, including chemical and corrosive environments.

Although the elastomeric sealing member 14 is preferably molded in a unitary structure, it would be possible to provide an extruded structure with bonded joints. However, this method incorporating such bonds has been shown to be relatively inconsistent and unreliable. Such bonds may also produce leak areas and thus, a liner or an inner tube would be required in such a structure.

The sealing member 14 outer contact wall 29 is also shown to have a plurality of external raised circumferential sealing and gripping ribs 36, for example, five. The gripping ribs 36 are shown to have V-shaped cross-sectional configurations, and preferably form an angle of incline "Y" with respect to the outer wall 29 of approximately 40–50 degrees. Other rib configurations, such as smooth rounded ribs or configurations of closely spaced pairs of ribs, have also shown to be effective for sealing and gripping purposes.

As best shown in FIG. 2, the sealing member end portions 30 are sealingly connected to the device 10 body structure via a pair of spacially parallel inner and outer channel structures 32 and 33, which are circumferentially disposed in the body structure and separated a predetermined distance. The channel structures 32 and 33 are each formed by a pair of concentric and aligned circular grooves 45 and 46 in the adjacent surfaces of the center section 13 and the respective plate members 11 and 12. The inner channel 32 is formed between the center section 13 and the inner plate member 12, while the outer channel 33 is formed between the center section 13 and the outer plate member 11. The channel structures 32 and 33 have a generally T-shaped cross-sectional configuration, including a narrow region of a first predetermined width, and a wide region of a second predetermined width which is greater than the first predetermined width. The dimensions of the channel structures are designed to compress the T-shaped cross-sectional configuration of the sealing member 14 end portions 31, when they are in their operative disposition within the channel structures 32 and 33, between approximately 20–40% of their uncompressed cross-sectional dimensions. Compression preferably occurs uniformly with respect to both the narrow and wide regions of the channel structures 32 and 33, so that the respective narrow and wide regions A and B of the sealing member end portions 31 are similarly compressed.

The compressing placement of the sealing member 14 end portions 31 in the body structure channels 32 and 33 produces a seal-tight configuration whereby fluid can be introduced in the cavity 28 for inflation purposes. This sealing structure configuration is made possible due to the three part nature of the plug body structure, including the center section 13 and the removable plates 11 and 12. During assembly, the sealing member 14 is aligned with the center section 13 so that its end portions 31 engage the grooves 45. The inner and outer plate members 11 and 12 are then connected to the center section 13 via the bolts 26. Sequential tightening of the bolts 26 results in the above described sealed, inflatable structure.

An inflation conduit 15 is shown disposed in the center section 13 to permit ingress and egress of air or other fluids via passages in the center section 13, into the the interior cavity 28 of the sealing member 14, and thereby inflate or deflate the sealing member 14. A threaded air passage aperture 35 in the center section 13 is exposed for connection to the inflation conduit 15 via an aperture 23 in the outer plate member 11, which is formed as a lateral extension of the axial bypass aperture 22. Alternatively, a standard inflator fitting, not shown, may be used in place of the inflation conduit 15.

One or more eyebolts 27 are shown disposed outwardly from the top surface of the boss 16, and which function to assist in carrying, handling, and maintaining the positioning of the plug 10 within the pipeline, and also for use in aiding extraction or removal of the plug 10 from the pipeline.

In summary, the plug 10 structures of this invention provide an economical and effective plug 10 which is suitable for holding back various types of liquid, gaseous or solid pipeline media, including corrosive chemicals and petroleum products. The plug 10 is further useful in pipelines of varying types and diameters in a given range utilizing a single plug size due to its inflatable expansible sealing member 14. And, the plug 10 is particularly useful in high pressure pipeline environments due to its locking structure.

As many changes are possible to the embodiments of this invention utilizing the teachings thereof, the descriptions above, and the accompanying drawings should be interpreted in the illustrative and not the limited sense.

That which is claimed is:

1. Inflatable plug device for sealing the interior of a high pressure pipeline, comprising:
   a. a compact body structure having a circular cross-section and inner and outer ends, said body structure including inner and outer removable plate members and a central section which are connected via a plurality of removable connection bolts, said body structure further having a pair of spacially parallel inner and outer channel structures circumferentially disposed thereon and being separated a predetermined distance, said channel structures having generally T-shaped cross-sectional configurations including a narrow region of a first predetermined width and a wide region of a second predetermined width which is greater than said first width;
   b. a unitary elastomeric annular sealing member, said sealing member being disposed circumferentially about said body structure, and forming an inner cavity between said sealing member and said body structure, said sealing member having a generally rectangular, open bottomed cross-section with an outer contact wall of a continuous predetermined longitudinal width and a radially continuous, non-folded circumference, and a pair of depending radial walls of a second predetermined width, each said radial wall terminating in an end portion having a generally T-shaped cross-sectional configuration with a narrow and a wide portion, said end portions forming spacially parallel rings which are sealingly compressed in their operative disposition within said channel structures between 20 to 40 percent of their uncompressed cross-sectional dimensions via sequential tightening of said connection bolts; and
   c. means to permit ingress and egress of fluid into said inner cavity.

2. The plug device of claim 1, wherein said sealing member is expansible radially outwardly to a predetermined distance, said predetermined distance being from 0 to 125 percent of said radial wall width.

3. The plug device of claim 1, where said sealing member elastomeric material is selected from the group consisting of natural rubber, nitrile, viton, urethane, neoprene and isoprene.

4. The plug device of claim 1, further comprising means to mechanically lock the plug device to the pipeline interior wall, said locking means being disposed in said body structure.

5. The plug device of claim 4, wherein said means to mechanically lock is comprised of a plurality of screw members radially disposed with respect to and depending from said body structure and being linearly movable to contact the pipeline interior wall.

6. The plug device of claim 5, wherein said means to mechanically lock further comprises at least one screw mounting structure extending longitudinally from said outer end of said body structure, each said screw mounting structure having one or more threaded apertures therein for reception of said screw members.

7. The plug device of claim 5, wherein said means to mechanically lock further comprises a screw mounting structure circumferentially extending from said body structure outer end, said circumferential extension having a plurality of threaded apertures equidistantly spaced therein for reception of said screw members.

8. The plug device of claim 1, wherein said sealing member outer contact wall has at least one external, raised circumferential sealing and gripping rib.

9. The plug device of claim 8, wherein said contact wall has five ribs, each said rib having a V-shaped cross-sectional configuration.

10. The plug device of claim 1, wherein said central section has a first predetermined diameter, and said plate sections have a second predetermined diameter, which is greater than said first predetermined diameter, whereby a circumferential recessed area is formed, and in which said sealing member is disposed, said plate sections being in side by side abutting relation to said sealing member radial walls, thereby preventing longitudinal expansion thereof.

11. The plug device of claim 1, wherein said means to permit ingress and egress of fluid is an inflation conduit, said inflation conduit being connected to said outer end of said body structure, and further being communicatively connected to said inner cavity between said sealing member and said body structure via a fluid passage.

12. The plug device of claim 1, wherein said body structure has an axially disposed central bypass aperture to permit the flow of matter therethrough, said bypass aperture having a removable plug disposed therein.

13. The plug device of claim 1, further comprising an eyebolt connected to said outer end of said body structure.

14. An inflatable expansible multisize plug device for sealing the interior of a high pressure pipeline section and for locking engagement therewith, comprising:

a) a cylindrical body structure having a circular cross-section, and including a central plate member and removable inner and outer plate members attached thereto via a plurality of longitudinally extending bolts disposed a predetermined distance from the axis of said body structure, wherein said central plate section has a first predetermined diameter, and said inner and outer plate sections have a second predetermined diameter which is greater than said first predetermined diameter, whereby a circumferential recessed area is formed, and in which said sealing member is disposed, said outer plate member further having a raised screw mounting structure longitudinally formed thereon, said body structure further having spacially parallel, circumferential, T-shaped annular channel structures formed between said central member and inner and outer members, respectively, said channel structures each being formed by concentric and aligned circular channels in adjacent surfaces of said central member and said respective inner and outer members, an inner channel structure being formed between said central member and said inner member, and an outer channel structure being formed between said central member and said outer member, whereby said channel structures each have a compressive width which is provided via sequential tightening of said connection bolts;

b) a unitary inflatable sealing member constructed of an elastomeric material with a durometer range of 50 to 85 shore A, said sealing member being disposed angularly about said body structure, and forming an inner cavity between said sealing member and said body structure, said sealing member having a generally rectangular, open bottomed cross-section having an outer contact wall of a continuous predetermined longitudinal width and a radially continuous, non-folded circumference, and a pair of depending radial walls, said outer contact wall being substantially flush with said inner and outer plate section perimeters, each said radial wall terminating in a T-shaped sealing ring, said sealing rings being sealingly disposed in said body structure channel structures, whereby said sealing rings are compressed in their operative disposition within said channel structures between 20 to 40 percent of their uncompressed cross-sectional dimensions by sequential tightening of said body structure bolts;

c) means to permit ingress and egress of fluid into said inner cavity, whereby said sealing member outer contact wall is expansible radially outwardly a distance less than 125 percent of the length of said radial walls; and d) a plurality of radially aligned locking screws, being arranged to mechanically engage the pipeline interior wall, said locking screws being disposed in said screw mounting structure.

* * * * *